(12) United States Patent
Derbeko et al.

(10) Patent No.: US 9,135,176 B1
(45) Date of Patent: Sep. 15, 2015

(54) SYSTEM AND METHOD FOR THIN PROVISIONING

(75) Inventors: Philip Derbeko, Modiin (IL); Roy E. Clark, Hopkinton, MA (US); Anat Eyal, Tel Aviv (IL)

(73) Assignee: EMC CORPORATION, Hopkinton, MA (US)

( * ) Notice: Subject to any disclaimer, the term of this patent is extended or adjusted under 35 U.S.C. 154(b) by 165 days.

(21) Appl. No.: 13/539,430

(22) Filed: Jun. 30, 2012

(51) Int. Cl.
*G06F 12/00* (2006.01)
*G06F 12/08* (2006.01)

(52) U.S. Cl.
CPC .......... *G06F 12/084* (2013.01); *G06F 12/0871* (2013.01); *G06F 12/0891* (2013.01)

(58) Field of Classification Search
CPC .............. G06F 12/084; G06F 12/0846; G06F 12/0848; G06F 12/0853; G06F 12/0871; G06F 12/0891
See application file for complete search history.

(56) References Cited

U.S. PATENT DOCUMENTS

| | | | |
|---|---|---|---|
| 6,085,254 A * | 7/2000 | Kotsinas et al. | 709/235 |
| 7,558,937 B2 * | 7/2009 | Nakashima et al. | 711/173 |
| 7,631,155 B1 * | 12/2009 | Bono et al. | 711/156 |
| 7,676,510 B1 * | 3/2010 | Karinta | 707/654 |
| 2007/0150690 A1 * | 6/2007 | Chen et al. | 711/170 |
| 2009/0144499 A1 * | 6/2009 | Nicholson et al. | 711/118 |
| 2010/0023685 A1 * | 1/2010 | Ikejiri et al. | 711/114 |
| 2012/0054306 A1 * | 3/2012 | Vaghani et al. | 709/217 |
| 2012/0131303 A1 * | 5/2012 | Goebel et al. | 711/171 |

OTHER PUBLICATIONS

Makatos, T., Klonatos, Y., Marazakis, M., Flouris, M., and Bilas, A. Using Transparent Compression to Improve SSD-based I/O Caches EuroSys'10, Apr. 13-16, 2010, Paris, France.*

* cited by examiner

*Primary Examiner* — Cheng-Yuan Tseng
*Assistant Examiner* — Francisco Grullon
(74) *Attorney, Agent, or Firm* — Brian J. Colandreo; Mark H. Whittenberger; Holland & Knight LLP

(57) ABSTRACT

A method, computer program product, and computing system for configuring a cache memory device to include a cache portion and a thinly-provisioned, direct attached storage portion. Data is stored on the thinly-provisioned, direct attached storage portion. At least a portion of the thinly-provisioned, direct attached storage portion is relinquished, thus generating a relinquished portion. The relinquished portion is reassigned to the cache portion.

21 Claims, 4 Drawing Sheets

SYSTEM AND METHOD FOR THIN PROVISIONING

TECHNICAL FIELD

This disclosure relates to cache systems and, more particularly, to thin provisioning of cache systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes configuring a cache memory device to include a cache portion and a thinly-provisioned, direct attached storage portion. Data is stored on the thinly-provisioned, direct attached storage portion. At least a portion of the thinly-provisioned, direct attached storage portion is relinquished, thus generating a relinquished portion. The relinquished portion is reassigned to the cache portion.

One or more of the following features may be included. At least a portion of the cache portion may be obtained, thus generating an obtained portion. The obtained portion may be reassigned to the thinly-provisioned, direct attached storage portion. Obtaining at least a portion of the cache portion may include invalidating one or more cache entries associated with the obtained portion. Configuring a cache memory device to include a cache portion and a thinly-provisioned, direct attached storage portion may include defining an upper capacity limit for the thinly-provisioned, direct attached storage portion. The cache memory device may be a flash-based cache memory device. The cache memory device may be included within a storage system. The storage system may include a data array.

In another implementation, a computer program product resides on a computer readable medium that has a plurality of instructions stored on it. When executed by a processor, the instructions cause the processor to perform operations including configuring a cache memory device to include a cache portion and a thinly-provisioned, direct attached storage portion. Data is stored on the thinly-provisioned, direct attached storage portion. At least a portion of the thinly-provisioned, direct attached storage portion is relinquished, thus generating a relinquished portion. The relinquished portion is reassigned to the cache portion.

One or more of the following features may be included. At least a portion of the cache portion may be obtained, thus generating an obtained portion. The obtained portion may be reassigned to the thinly-provisioned, direct attached storage portion. Obtaining at least a portion of the cache portion may include invalidating one or more cache entries associated with the obtained portion. Configuring a cache memory device to include a cache portion and a thinly-provisioned, direct attached storage portion may include defining an upper capacity limit for the thinly-provisioned, direct attached storage portion. The cache memory device may be a flash-based cache memory device. The cache memory device may be included within a storage system. The storage system may include a data array.

In another implementation, a computing system includes at least one processor and at least one memory architecture coupled with the at least one processor, wherein the computing system is configured to perform operations including configuring a cache memory device to include a cache portion and a thinly-provisioned, direct attached storage portion. Data is stored on the thinly-provisioned, direct attached storage portion. At least a portion of the thinly-provisioned, direct attached storage portion is relinquished, thus generating a relinquished portion. The relinquished portion is reassigned to the cache portion.

One or more of the following features may be included. At least a portion of the cache portion may be obtained, thus generating an obtained portion. The obtained portion may be reassigned to the thinly-provisioned, direct attached storage portion. Obtaining at least a portion of the cache portion may include invalidating one or more cache entries associated with the obtained portion. Configuring a cache memory device to include a cache portion and a thinly-provisioned, direct attached storage portion may include defining an upper capacity limit for the thinly-provisioned, direct attached storage portion. The cache memory device may be a flash-based cache memory device. The cache memory device may be included within a storage system. The storage system may include a data array.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
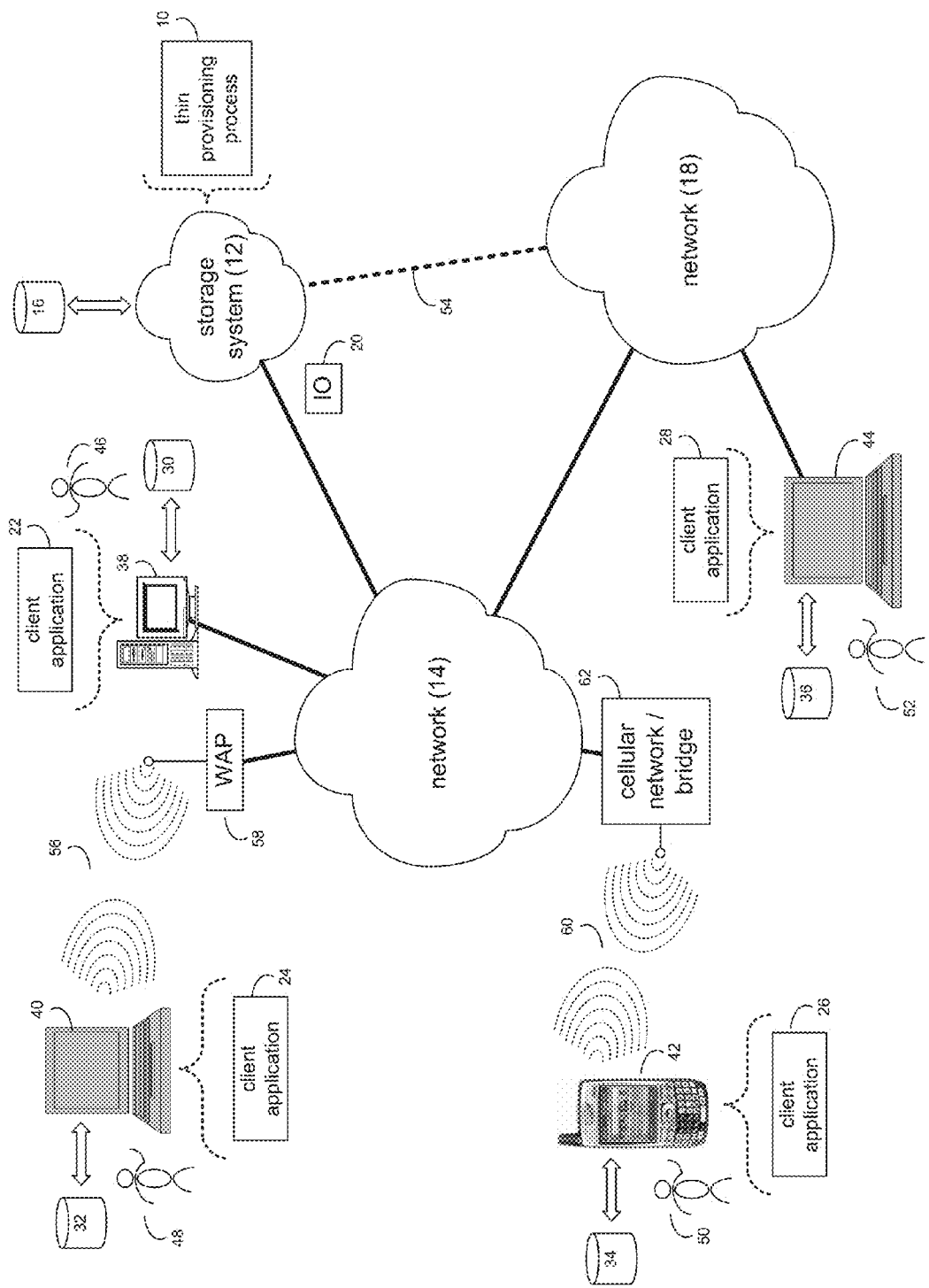
FIG. 1 is a diagrammatic view of a storage system and a thin provisioning process coupled to a distributed computing network.

System Overview:

Referring to FIG. 1, there is shown thin provisioning process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™ Unix, or a custom operating system, for example.

The instruction sets and subroutines of thin provisioning process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
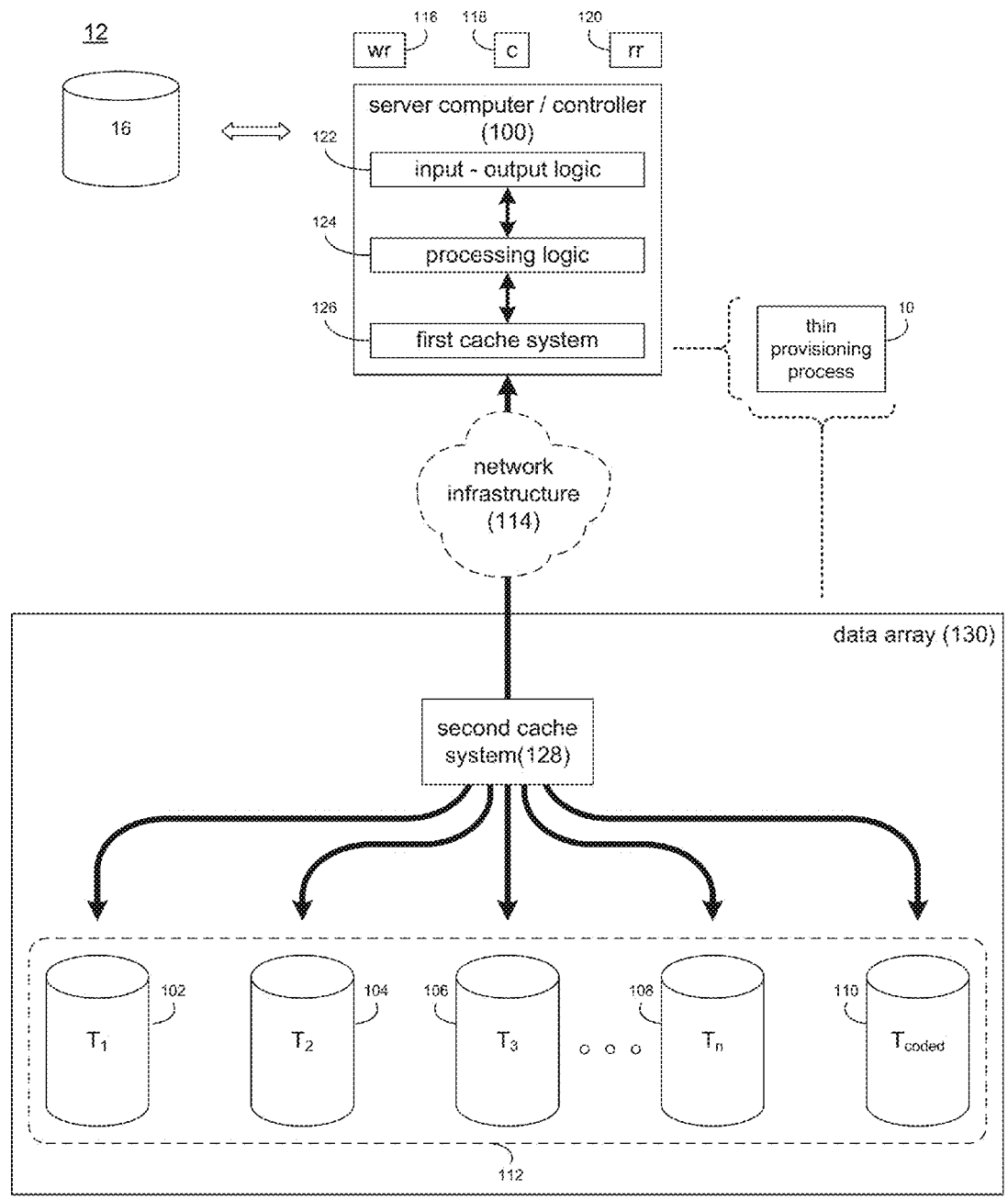
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of thin provisioning process 10. The instruction sets and subroutines of thin provisioning process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced. As will be described below in greater detail, second cache system 128 may be a content-aware cache system.

As discussed above, the instruction sets and subroutines of thin provisioning process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of thin provisioning process 10 may be executed by one or more processors (not shown) and one or more memory architectures (not shown) included within data array 130.

Figure 3:
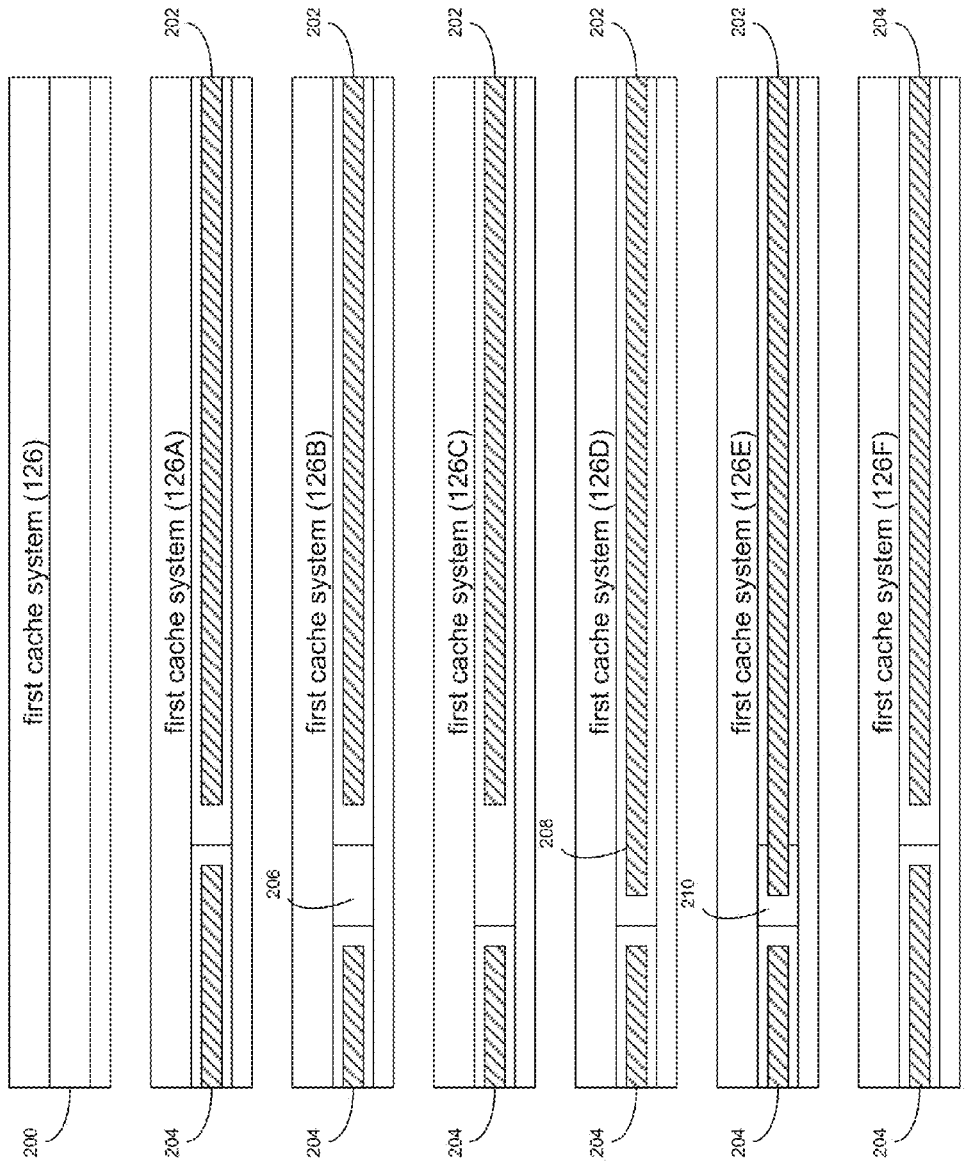
FIG. 3 are various diagrammatic views of a first cache system as modified by the thin provisioning process of FIG. 1.

Thin Provisioning Process:

Referring also to FIG. 3 and as discussed above, server computer/controller 100 may include first cache system 126, which may include but is not limited to a non-volatile, solid-state, cache memory system (e.g., a flash-based, cache memory system).

Specifically and in FIG. 3, there are shown seven different iterations of first cache system 126. Initially and in its native state, first cache system 126 is configured in the manner discussed above. Namely the entire capacity (e.g., portion 200) of first cache system 126 may be utilized for caching purposes. Assuming for illustrative purposes that first cache system 126 is a 32.0 gigabyte cache system, all (or essentially all) 32.0 gigabytes of first cache system 126 may be available for caching data.

Figure 4:
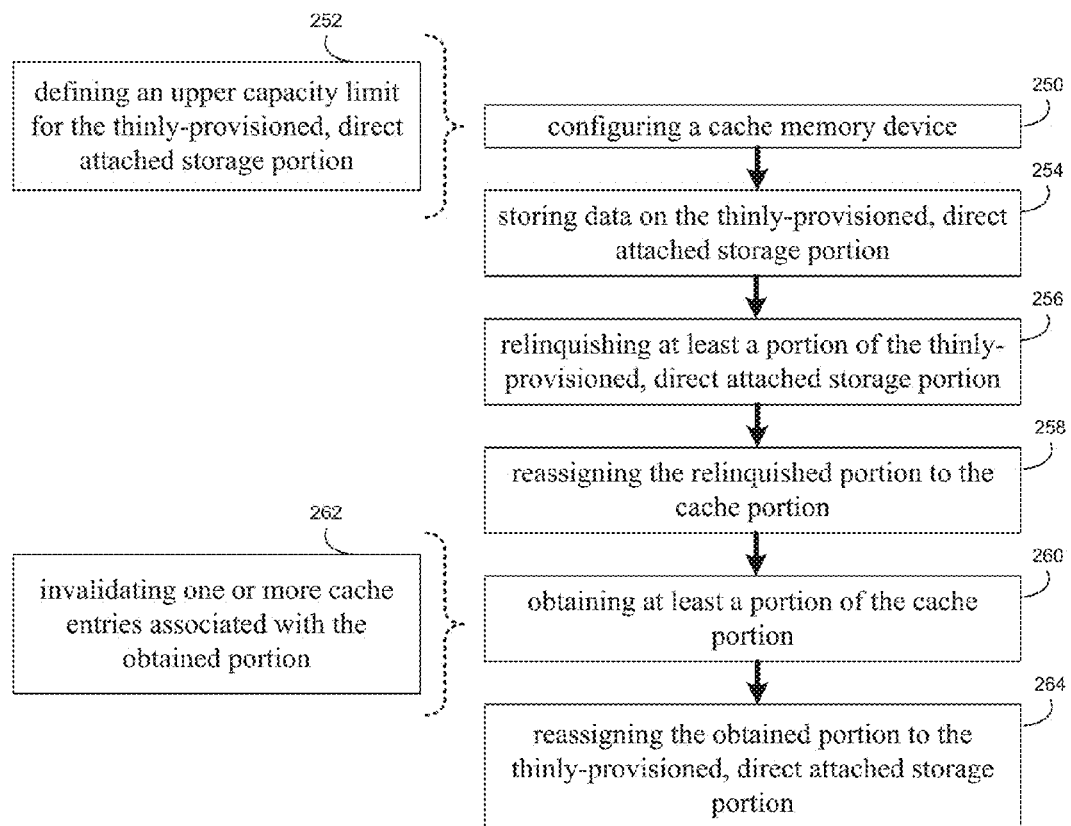
FIG. 4 is a flow chart of the thin provisioning process of FIG. 1.

Referring also to FIG. 4, thin provisioning process 10 may allow an administrator (e.g., user 46) of storage system 12 to configure 250 cache memory device (e.g., first cache system 126A) to include a cache portion (e.g., cache portion 202) and a thinly-provisioned, direct attached storage portion (e.g., storage portion 204). For example, first cache system 126A may be configured so that cache portion 202 is reduced from 32.0 gigabytes to 24.0 gigabytes and storage portion 204 is 8.0 gigabytes. As thin provisioning is utilized, when configuring 250 first cache memory device 126A to include cache portion 202 and a thinly-provisioned, direct attached storage portion 204, thin provisioning process 10 may allow user 46 to merely define 252 an upper capacity limit (e.g., 8.0 gigabytes) for thinly-provisioned, direct attached storage portion 204.

Accordingly, if there is no data currently being stored within storage portion 204, the actual size of storage portion 204 will be reduced to 0.0 gigabytes. And during use, thin provisioning process 10 may store 254 data within thinly-provisioned, direct attached storage portion 204 and the size of storage portion 204 may be increased to as large as 8.0 gigabytes. In the event that a user tries to exceed the 8.0 gigabytes limit concerning storage portion 204, thin provisioning process 10 may issue an error message and the storage procedure may be halted until e.g., user 46 increases the size of storage portion 204 (e.g., up to 12.0 gigabytes).

Assume for illustrative purpose that while a storage portion of 8.0 gigabytes was initially needed, the quantity of required storage has fallen off. Accordingly, a portion of storage portion 204 may no longer be needed. Accordingly, thin provisioning process 10 may relinquish 256 at least a portion of thinly-provisioned, direct attached storage portion 204, thus generating relinquished portion 206 (as shown in first cache memory system 126B). Thin provisioning process 10 may reassign 258 relinquished portion 206 to cache portion 202. Assume for illustrative purposes that relinquished portion 206 is 3.0 gigabytes. Accordingly, the size of storage portion 204 may be reduced by thin provisioning process 10 from 8.0 gigabytes to 5.0 gigabytes. Further, the size of cache portion 202 may be increased by thin provisioning process 10 from 24.0 gigabytes to 27.0 gigabytes (as shown in first cache system 126C).

Assume that the now larger 27.0 gigabyte cache portion 202 essentially gets filled with cache data 208 (as shown in first cache system 126D). Further assume that due to an uptick in required storage capacity, thin provision process 10 once again needs storage portion 204 to be 8.0 gigabytes in size. Accordingly, thin provisioning process 10 may obtain 260 a portion of cache portion 202, thus generating obtained portion 210 (as shown in first cache system 126E). In this particular example, obtained portion 210 is a 3.0 gigabyte portion of cache portion 202, which is the same size as relinquished portion 206 described above. However and as shown in first cache system 126E, some cache data is stored within obtained portion 210. Accordingly, when obtaining 260 a portion of cache portion 202, thin provisioning process 10 may invalidate 262 one or more cache entries associated with obtained portion 210. Accordingly, any cache data that was stored within obtained portion 210 is no longer going to be available via first cache system 126. Accordingly, the cache entries defined within the appropriate cache directory (not shown) will need to be invalidated 262 by thin provisioning process 10.

Once the above-described cache entries are invalidated 262, thin provisioning process 10 may reassign 264 obtained portion 210 to thinly-provisioned, direct attached storage portion 204.

As storage portion 204 is thinly provisioned, the above-described process of increasing and decreasing the size of storage portion 204 and taking capacity away from or adding capacity to cache portion 202 (respectively) may be repeated.

For ease of illustration, the system was described above from the point of view that the cache portion was initially empty at the time that the storage portion was being filled. Accordingly, no cache invalidation procedures were required in order for the storage portion to reach its maximum capacity. However, such situations are rare, as the cache portion is typically populated when the storage portion is defined and, therefore, for data to be placed into the storage portion, cache invalidation procedures may need to be utilized to free up cache portion space for use as storage portion space.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
configuring a cache memory device to include a cache portion with a first predefined capacity and a thinly-provisioned, direct attached storage portion with a second predefined capacity;
storing data, via a data storage process, on the thinly-provisioned, direct attached storage portion;
relinquishing at least a portion of the thinly-provisioned, direct attached storage portion, thus generating a relinquished portion;
reassigning the relinquished portion to the cache portion;
if it is determined that data to be stored within the thinly-provisioned, direct attached storage portion exceeds the second predefined capacity:
issuing an error message;
halting the data storage process until an administrator increases the size of the thinly-provisioned, direct attached storage portion;
obtaining at least a portion of the cache portion, thus generating an obtained portion; and
invalidating one or more cache entries included within the obtained portion.

2. The computer-implemented method of claim 1 further comprising:
reassigning the obtained portion to the thinly-provisioned, direct attached storage portion.

3. The computer-implemented method of claim 1 wherein obtaining at least a portion of the cache portion includes:
invalidating the one or more cache entries defined within a cache directory.

4. The computer-implemented method of claim 1 wherein configuring a cache memory device to include a cache portion and a thinly-provisioned, direct attached storage portion includes defining an upper capacity limit for the thinly-provisioned, direct attached storage portion.

5. The computer-implemented method of claim 1 wherein the cache memory device is a flash-based cache memory device.

6. The computer-implemented method of claim 1 wherein the cache memory device is included within a storage system.

7. The computer-implemented method of claim 6 wherein the storage system includes a data array.

8. A computer program product residing on a non-transitory computer readable medium having a plurality of instructions stored thereon which, when executed by a processor, cause the processor to perform operations comprising:
configuring a cache memory device to include a cache portion with a first predefined capacity and a thinly-provisioned, direct attached storage portion with a second predefined capacity;

storing data, via a data storage process, on the thinly-provisioned, direct attached storage portion;

relinquishing at least a portion of the thinly-provisioned, direct attached storage portion, thus generating a relinquished portion;

reassigning the relinquished portion to the cache portion;

if it is determined that data to be stored within the thinly-provisioned, direct attached storage portion exceeds the second predefined capacity:

issuing an error message; and halting the data storage process until an administrator increases the size of the thinly-provisioned, direct attached storage portion;

obtaining at least a portion of the cache portion, thus generating an obtained portion; and invalidating one or more cache entries included within the obtained portion.

9. The computer program product of claim 8 further comprising instructions for:

reassigning the obtained portion to the thinly-provisioned, direct attached storage portion.

10. The computer program product of claim 8 wherein the instructions for obtaining at least a portion of the cache portion include:

invalidating the one or more cache entries defined within a cache directory.

11. The computer program product of claim 8 wherein the instructions for configuring a cache memory device to include a cache portion and a thinly-provisioned, direct attached storage portion include defining an upper capacity limit for the thinly-provisioned, direct attached storage portion.

12. The computer program product of claim 8 wherein the cache memory device is a flash-based cache memory device.

13. The computer program product of claim 8 wherein the cache memory device is included within a storage system.

14. The computer program product of claim 13 wherein the storage system includes a data array.

15. A computing system including at least one processor and at least one memory architecture coupled with the at least one processor, wherein the computing system is configured to perform operations comprising:

configuring a cache memory device to include a cache portion with a first predefined capacity and a thinly-provisioned, direct attached storage portion with a second predefined capacity;

storing data, via a data storage process, on the thinly-provisioned, direct attached storage portion;

relinquishing at least a portion of the thinly-provisioned, direct attached storage portion, thus generating a relinquished portion;

reassigning the relinquished portion to the cache portion;

if it is determined that data to be stored within the thinly-provisioned, direct attached storage portion exceeds the second predefined capacity:

issuing an error message; and halting the data storage process until an administrator increases the size of the thinly-provisioned, direct attached storage portion;

obtaining at least a portion of the cache portion, thus generating an obtained portion; and invalidating one or more cache entries included within the obtained portion.

16. The computing system of claim 15 further configured to perform operations comprising:

reassigning the obtained portion to the thinly-provisioned, direct attached storage portion.

17. The computing system of claim 15 wherein obtaining at least a portion of the cache portion includes:

invalidating the one or more cache entries defined within a cache directory.

18. The computing system of claim 15 wherein configuring a cache memory device to include a cache portion and a thinly-provisioned, direct attached storage portion includes defining an upper capacity limit for the thinly-provisioned, direct attached storage portion.

19. The computing system of claim 15 wherein the cache memory device is a flash-based cache memory device.

20. The computing system of claim 15 wherein the cache memory device is included within a storage system.

21. The computing system of claim 20 wherein the storage system includes a data array.

* * * * *